United States Patent [19]
Kondou

[11] Patent Number: 5,799,171
[45] Date of Patent: Aug. 25, 1998

[54] IC CARD READER/WRITER FOR ALLOWING COMMUNICATION WITH A PLURALITY OF KINDS OF IC CARDS OF DIFFERENT PROTOCOL TYPES

[75] Inventor: Youko Kondou, Yokohama, Japan

[73] Assignee: Kabushiki Kaisha Toshiba, Kawasaki, Japan

[21] Appl. No.: 651,483

[22] Filed: May 22, 1996

[30] Foreign Application Priority Data

May 23, 1995 [JP] Japan ................. 7-123768

[51] Int. Cl.⁶ ............... G06F 13/00; G06F 17/30
[52] U.S. Cl. ............... 395/500; 395/830; 395/831
[58] Field of Search ............... 395/830, 831, 395/500

[56] References Cited

U.S. PATENT DOCUMENTS

| | | | |
|---|---|---|---|
| 4,855,905 | 8/1989 | Estrada et al. | 364/200 |
| 5,613,096 | 3/1997 | Danknick | 395/500 |
| 5,655,145 | 8/1997 | Chejlave, Jr. et al. | 385/821 |

FOREIGN PATENT DOCUMENTS

| | | |
|---|---|---|
| 0 513 507 | 11/1992 | European Pat. Off. . |
| 0 554 164 | 8/1993 | European Pat. Off. . |
| 2 703 167 | 9/1994 | France . |

OTHER PUBLICATIONS

Patent Abstracts of Japan, vol. 13, No. 64, (P-827) Oct. 1988 re JP 63-250789.

Patent Abstracts of Japan, vol. 13, No. 64, (P-827) Oct. 1988 re JP 63-250726.

Patent Abstracts of Japan, vol. 18, No. 74, (P-1688) Oct. 1993 re JP 05-282534.

Patent Abstracts of Japan, vol. 16, No. 218 (P-1357) Feb. 1992 re JP 04-042321.

*Primary Examiner*—Thomas C. Lee
*Assistant Examiner*—Rehana Perveen
*Attorney, Agent, or Firm*—Cushman Darby & Cushman IP Group of Pillsbury Madison & Sutro

[57] ABSTRACT

Upon activating an inserted IC card, a reader/writer identifies a protocol type of the IC card based on initial response data sent from the IC card. When the protocol type of the IC card is the same as that of the host unit as verified by the identification, control is effected to allow direct data transfer to be made between the host unit and the IC card. When, on the other hand, the protocol type is different from that of the host unit as verified by the identification, control is made so as to allow data transfer to be made between the host unit and the IC card subsequent to protocol conversion. By doing so, one IC card reader/writer can hand a plurality of IC cards different in type from each other.

7 Claims, 4 Drawing Sheets

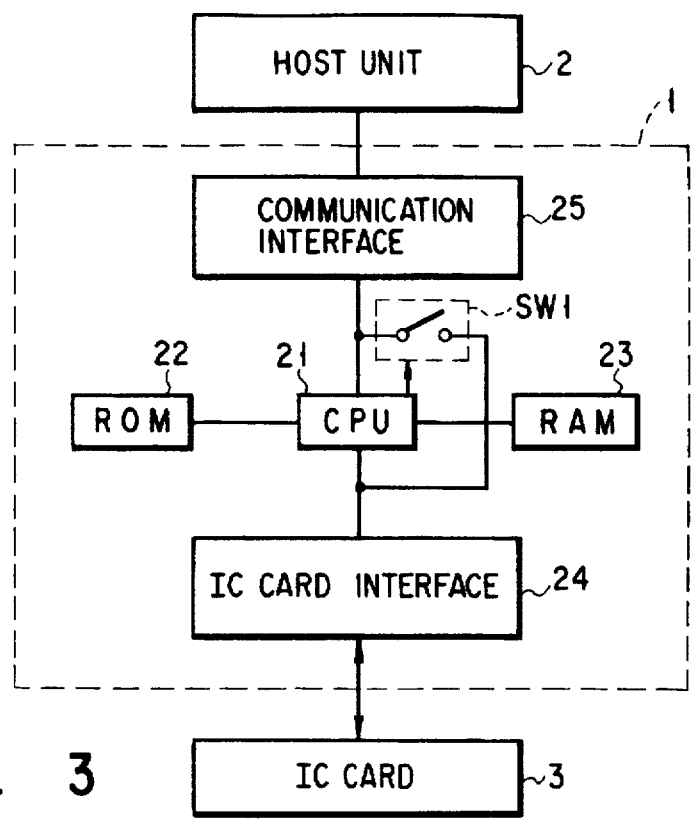
F I G. 3
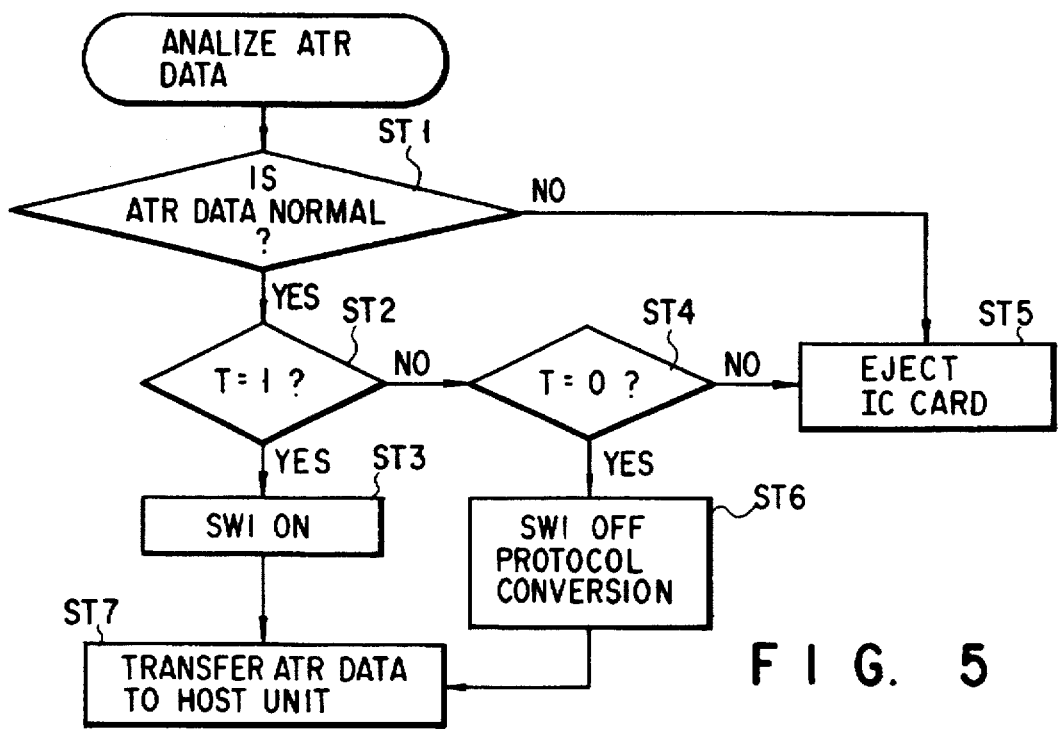
F I G. 5

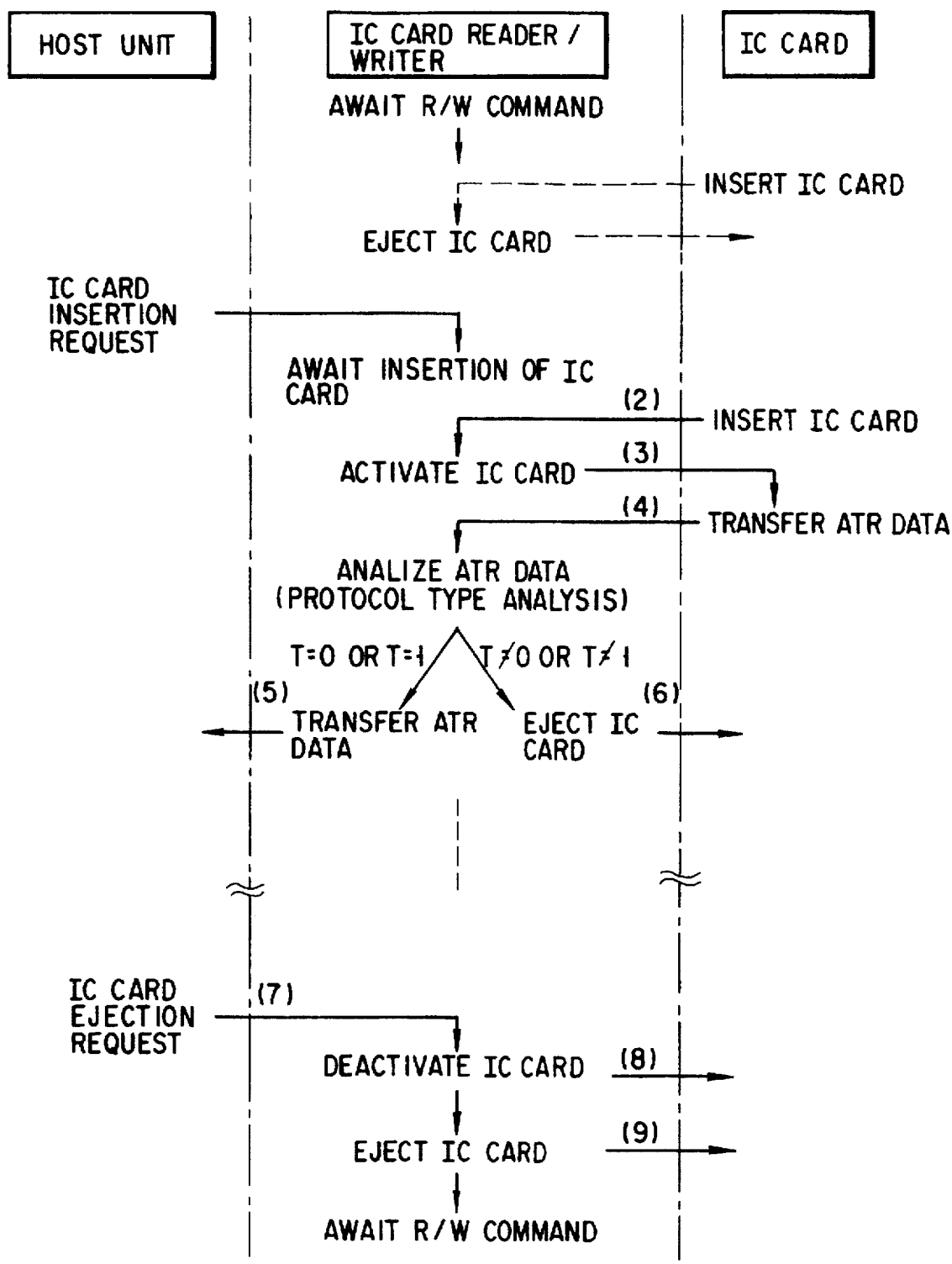
F I G. 4

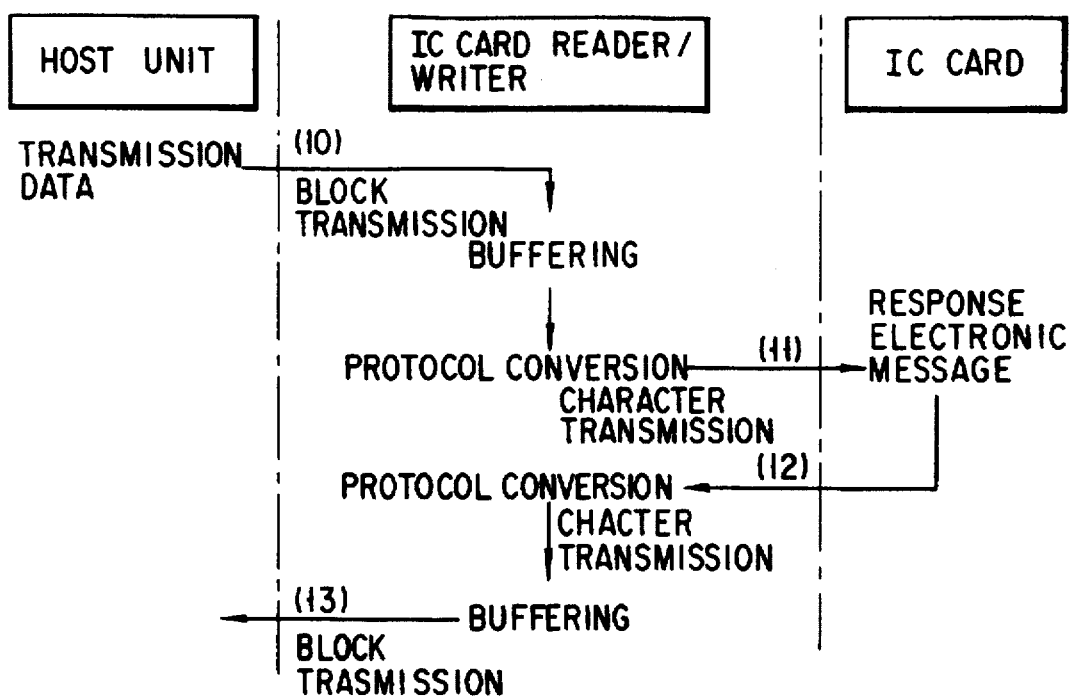
F I G. 6
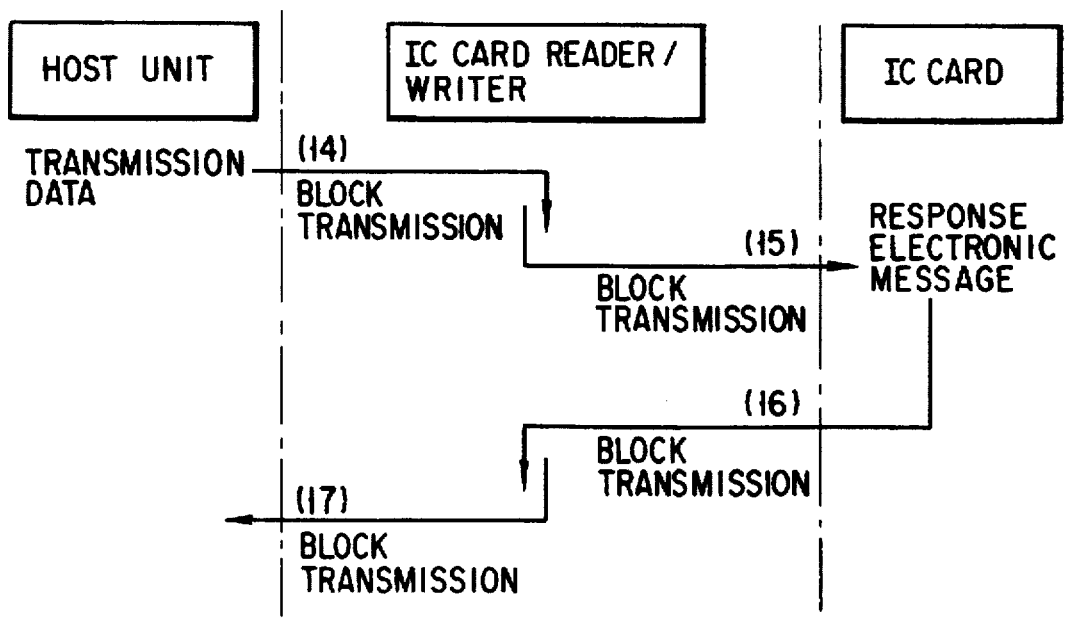
F I G. 7

IC CARD READER/WRITER FOR ALLOWING COMMUNICATION WITH A PLURALITY OF KINDS OF IC CARDS OF DIFFERENT PROTOCOL TYPES

BACKGROUND OF THE INVENTION

1. Field of the Invention

The present invention relates to an IC card reader/writer for reading/writing data from/to, for example, IC cards different in type from each other and a method for transferring data to and from IC cards.

2. Description of the Related Art

Conventionally, when an IC card whose protocol type belongs to the international standard protocol T=1 (half-duplex start-stop synchronization block transmission protocol) is operated, use has been made of an IC card reader/writer corresponding to an IC card of the protocol type T=1, while, when an IC card whose protocol type belongs to the international standard protocol T=0 (half-duplex start-stop character transmission protocol) is operated, use has been made of an IC card reader/writer corresponding to an IC card of the protocol type T=0.

As appreciated from the above, when the IC card of the protocol type T=1 and IC card of the protocol type T=0 are to be operated, it is necessary to have two corresponding IC card reader/writers, one of which is of a type T=1 and the other of which is of a type T=0. It has been impossible, therefore, to operate these different kinds of IC cards (T=1, T=0) on one IC card reader/writer.

SUMMARY OF THE INVENTION

It is accordingly the object of the present invention to provide an IC card reader/writer and data transfer method which can handle a plurality of kinds of IC cards of different protocol types.

In order to achieve the above object, according to one aspect of the present invention, there is provided an IC card reader/writer connected to a host unit based on a first protocol and adapted to be operated based on a command from the host unit and to allow data transfer to and from an inserted IC card, comprising:

identifying means for, when an inserted IC card is activated, identifying a protocol type of the IC card based on a specific piece of data sent from the IC card;

first control means for, when the protocol type of the IC card belongs to a first type as a result of identification by the identifying means, allowing direct data transfer to be made between the IC card and the host unit; and second control means for, when as a result of identification by the identifying means the protocol type of the IC card belongs to a second type different from the first type, allowing data transfer to be made between the host unit and the IC card after subjecting transfer data to protocol conversion.

According to another aspect of the present invention, there is provided a method for transferring data in an IC card reader/writer connected to a host unit based on a first protocol and adapted to be operated based on a command from the host unit and to allow data transfer to and from an inserted IC card, comprising the steps of:

when an inserted IC card is activated, identifying a protocol type of the IC card based on a specific piece of data sent from the IC card and providing a result of identification;

when the protocol type of the IC card belongs to a first type as verified by the identification, effecting control to allow direct data transfer to be made between a host unit and the IC card;

when the protocol type of the IC card is a second type different from the first type as verified by the identification, subjecting transfer data to protocol conversion; and effecting control to transfer the protocol-converted data between the host unit and IC card.

In this way, the IC card reader/writer according to the present invention can handle IC cards whose protocol types differ from each other and, by doing so, for example, it can be used on a different IC card even if the IC card of the user belongs to either a protocol type T=0 or a protocol type T=1.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a block diagram schematically showing an arrangement of an IC card reader/writer;

FIG. 4 is a flow chart for explaining a basic operation of the IC card reader/writer;

FIG. 5 is a flow chart for explaining an analytical action of initial response data;

FIG. 6 is a flow chart for explaining an operation when a protocol type of the IC card is T=0; and FIG. 7 is a flow chart for explaining an operation when a protocol type of an IC card is T=1.

DETAILED DESCRIPTION OF THE PREFERRED EMBODIMENTS

One embodiment of the present invention will be explained below with reference to the accompanying drawings.

Figure 1:
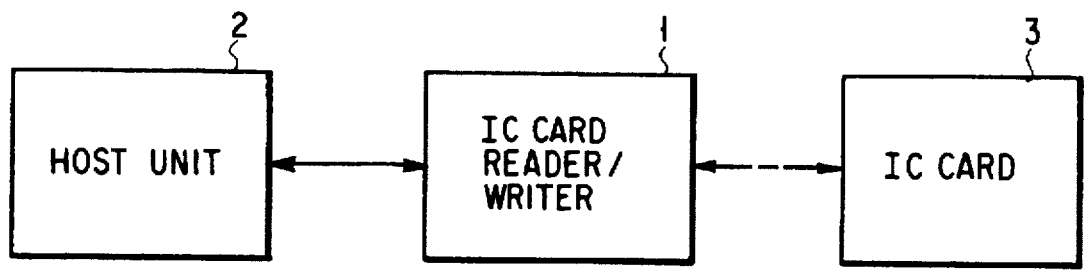
FIG. 1 is a block diagram schematically showing a practical array of an IC card reader/writer system of the present invention.

FIG. 1 shows a practical system of an IC card reader/writer according to the present invention. That is, an IC card reader/writer 1 is connected, via an RS-232C interface for example, to a host apparatus 2 serving as a high-level apparatus. Upon receipt of an IC card 3, the IC card reader/writer 1 accepts it to allow data to be read from, or written to, the IC card.

Figure 2:
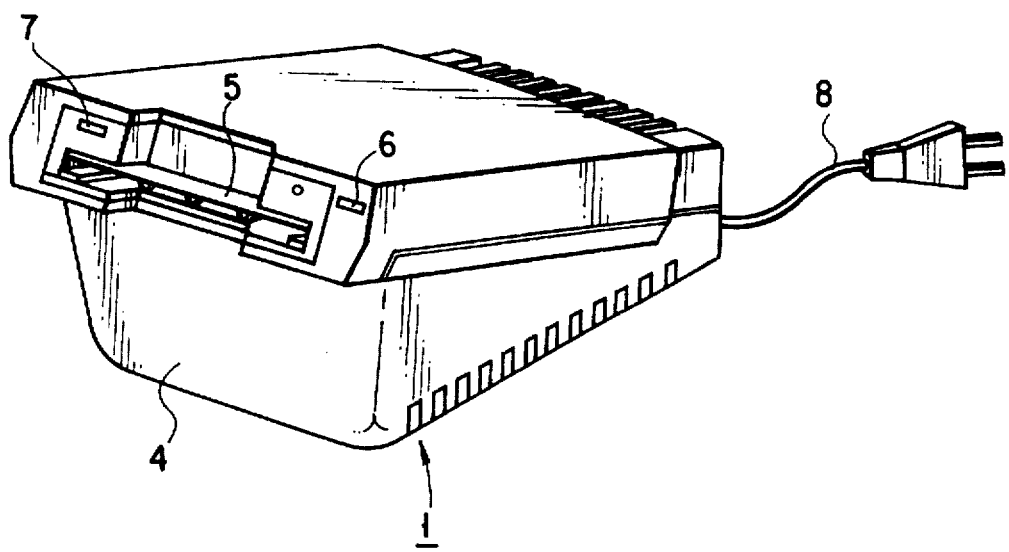
FIG. 2 is a schematic view showing an outer appearance of the IC card reader/writer.

FIG. 2 is an outer view showing the IC card reader/writer 1. At the front side of a body 4 of the IC card reader/writer 1 are provided, for example, a card insertion inlet 5 for inserting an IC card 3, a power supply lamp 6 lighted when a power supply is turned on, an access lamp 7 lighted when the reader/writer is accessed by the IC card 3. Reference numeral 8 shows a power supply cord.

FIG. 3 is a block diagram showing the arrangement of the IC card reader/writer. That is, to a CPU (central processing unit) 21 is connected a read only memory (ROM) 22, random access memory (RAM) 23, IC card interface 24 and communication interface 25. The communication interface 25 is comprised of an RS-232C interface and connected to a host unit 2. The RAM 23 is used for storing various kinds of data. The IC card interface 24 serves as an interface to the IC card 1 via a contact, not shown, and, after performing predetermined conversion processing, etc., on the IC card data, sends the corresponding data to the CPU 21. The IC card interface 24 also performs predetermined conversion processing, etc., on the data from the CUP 21 and transfers it to the IC card 1 via a contact, not shown.

The communication interface 25 serves as an interface upon communication to and from the host unit 2 and, after performing serial/parallel conversion processing, etc., on the data from the host unit 2, transfers the corresponding data the CPU 21. The communication interface 25 performs parallel/serial conversion processing, etc., on the data from the CUP 21 and sends it to the host unit 2. A switch SW1 is turned ON at a "through mode" as will be set out below and turned OFF at the other time.

The basic operation of the IC card reader/writer 1 in the arrangement above will be explained below with reference to a flow chart as shown in FIG. 4.

In the IC card reader/writer 1, with the power supply turned ON, the CUP 21 is reset, the memories (ROM 22, RAM 23) are checked, associated hardware and software are initialized, and soon. At this time, if the IC card 3 is inserted into the IC card reader/writer 1, the IC card reader/writer 1 ejects the IC card therefrom.

When the resetting of the CPU 21, checking of the memories, initialization of the hardware and software are normally completed, the IC care reader/writer 1 is in a state ready for a R/W (reader/writer) command to be transferred from the host unit 2. When, in this state, the IC card reader/writer 1 receives an IC card insertion request command from the host unit 2—step (1), an IC card user can insert his or her IC card 3 into the card insertion inlet 5 of the IC card reader/writer 1—step (2). If, in this case, the IC card 3 is inserted before receiving the IC card insertion request command, the IC card reader/writer 1 rejects the IC card.

With the IC card timely inserted, the reader/writer 1 detects the IC card and accepts it for holding. The IC card reader/writer 1 performs such IC card activating operations as the supplying of the power, supplying of a 3.5 MHz clock pulse and releasing of the resetting—step (3).

Upon the activating operation by the IC card reader/writer, the Ic card 3 transfers initial response data called "an ATR (answer to reset)" to the IC card reader/writer 1—step (4). Here, it is assumed that the initial response data contains data representing a type of protocol for the IC card. This is the already well-known technique and any further explanation of it is, therefore, emitted.

The CPU 21 in the IC card reader/writer 1 analyzes the initial response data sent from the IC card 3 and identifies the type of the protocol for the inserted IC card 3.

The analysis of the initial response data is carried out in accordance with a flow chart as shown, for example, in FIG. 5. First, checking is made to see whether the initial response data from the IC card 3 is normal or not (ST1). If the answer is in the negative, the inserted IC card 3 is ejected from the reader/writer (ST5). If, on the other hand, the answer is in the affirmative, determination is made about whether or not the type of the protocol in the initial response data belongs to an initially determined one protocol, for example, the international standard protocol T=1 (half-duplex start-stop synchronization block transmission protocol) (ST2). If it is T=1, then the type of the protocol in the IC card 3 is determined to be T=1 and the switch SW1 is turned ON, that is, the mode is set to the "through" mode as will be set out below (ST3). Thereafter, the initial response data is transferred to the host unit 2 via the RS-232interface (ST7).

If a result of determination is not T=1, determination is made about whether or not the type of the protocol in the initial response data belongs to another type of the protocol initially determined, for example, T=0 (half-duplex start-stop character transmission protocol) (ST4). If T=0, then the switch SW1 is turned OFF, that is, the mode is set to a "through" inhibiting mode as will be set out below (ST6). Thereafter, the initial response data is transferred to the host unit 2 via the RS-232C interface (ST7).

In this way, when the type of the protocol of the IC care 3 is T=0 or T=1, the IC card reader/writer 1 transfers the initial response data from the IC card 3 to the host unit 2 via the RS-232C interface—step (5). When the type of the protocol of the IC card 3 is neither T=0 nor T=1 through the analysis of the initial response data, the IC card ready/write 1 ejects the IC card therefrom—step (6).

When the IC card ejection request command is received from the host unit 2—step (7)—after given data is transferred between the IC card 1 and the host unit 2, the IC card reader/writer 1 resets the IC card 3 through its nonactivating action on the IC card, stopping the supply of a power and of a clock pulse—step (8). Thereafter, the IC card reader/writer 1 ejects the IC card 3 therefrom—step (9) and is placed back to a state ready for a W/R command to be received from the host unit 2.

An explanation will be given below of the processing by the IC card reader/writer 1 in the case where a command is sent from the host. Here it is assumed that the host unit 2 is based on the protocol type T=1.

First, when the protocol type of the inserted IC card 3 is T=0, that is, the IC card reader/writer 1 receives, from the IC card 3, an initial response data presented with the protocol type T=0, the IC card reader/writer 1 sets the data transmission method to a through inhibiting mode (SW1: OFF) and the transmission data from the host unit 2 has an attached node address. The data is transferred to the IC card reader/writer. The CPU 21 of the IC card reader/writer checks the transmission data from the host unit and, if the node address of the transmission data belongs to the IC card, the IC card reader/writer buffers the transmission data and, after being protocol-converted, transferred to the IC card 3.

Here, with reference to the flow chart as shown in FIG. 6, explanation will be given below about the case where the host unit 2 writes data into the IC card. Since the host unit 2 is based on the half-duplex short-stop synchronization block transmission protocol (T=1), it transmits data, as a block transmission format, at each 64 byte for instance to the IC card reader/writer 1—step (10). The IC card reader/writer 1 buffers the transmission data to the IC card and protocol-converts a half-duplex start-stop synchronization block transmission to a half-duplex start-stop character transmission format and, as the character transmission format, transmits data to the IC card 3 at each byte for instance—step (11).

The IC card 3 writes the transmitted data into memory and then a corresponding electronic response message is transmitted as a character transmission format to the IC card reader/writer 1—step (12). The IC card reader/writer 1 buffers the transmission data coming from the IC card 3 and protocol-converts the half-duplex start-stop character transmission to a half-duplex start-stop synchronization block transmission format. By doing so, the data is transmitted as a block transmission format to the host unit 2—step (13).

In the case where the protocol type of the inserted IC card 3 is T=1, that is, initial response data presented with the protocol type T=1 is received from the IC card 3, the IC card reader/writer 1 supplied the data transmission method to a through mode (SW1: ON). The transmission data from the host unit 2 is supplied to both the IC card reader/writer and the IC card. The CPU 21 of the IC card reader/writer checks the transmission data coming from the host unit 2 and, when the node address of the transmission data is other than that from the IC card reader/writer, disregards the transmission data. By doing so, the transmission data directed from the host unit 2 to the IC card is transmitted directly to the IC card.

With reference to a flow chart as shown in FIG. 7, explanation will be given below about the case where the host unit 2 writes data into the IC card.

The host unit 2 transmits data, as a block transmission format, to the IC card reader/writer 1 at each 64 bytes for instance—step (14). When T=1, the IC card reader/writer 1 does not buffer the transmission data to the IC card 3 and transmits the data, as a through mode, to the IC card 3 in the form of the block transmission format—step (15).

After writing the transmission data into memory, the IC card 3 transmits a corresponding electronic message to the IC card reader/writer 1 as a block transmission format at each 64 bytes for instance—step (16). Since the IC card reader/writer 1 is set to be in a through mode when T=1, the transmission data to the host unit 2 is not buffered and thus the data is transmitted as a block transmission format to the host unit—step (17).

When the data transmission between the host unit 2 and the IC card 1 is completed, the host unit 2 sends an IC card ejection request command with a node address of the IC card reader/writer attached thereto the IC card reader/writer—step (7). Upon receipt of this request command, the IC card reader/writer 1 deactivates the IC card as set out above—step (8), ejects the IC card therefrom—step (9) and is placed in a R/W command wait state.

Even if the protocol of the IC card 3 is either T=0 or T=1, the data transmission between the IC card reader/writer 1 and the host unit 2 is carried out based on the half-duplex start-stop synchronization block transmission protocol (T=1). When T=0, the transmit/receive block between the host unit 2 and the IC card 3 is transmitted to the host unit 2 or the IC card 3 after the buffering of the transmission data by the IC card and, when T=1, the through mode is involved with no buffering.

By doing so, the IC card 3 owned by the user can be handled by a single IC card reader/writer even if the protocol type is either T=0 or T=1.

Although the above-mentioned embodiment has been explained in connection with the protocol type being T=1 or T=0, the present invention is not restricted thereto and it can also be applied to other types.

Further, use may be made of three or four types of protocols without being restricted to two types only.

According to the present invention, as set out above, there are provided an IC card reader/writer and data transmission method which can be applied to several IC cards whose protocol types are different from each other.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An IC card reader/writer connected to a host unit performing communication based on a first protocol and adapted to be operated based on a command from the host unit and to transfer data to and from an inserted IC card, comprising:

first receiving means for receiving an IC card insertion request command from the host unit;

activating means for activating the IC card when the IC card is inserted;

second receiving means for receiving a specific piece of data from the IC card when the IC card is activated;

identifying means for identifying a protocol type of the IC card based on the data received by the second receiving means;

first control means for, when the protocol type of the IC card corresponds to the first protocol, the same type as the host unit, as a result of identification by the identifying means, transferring data between the IC card and the host unit directly; and second control means for, when as a result of identification by the identifying means the protocol type of the IC card corresponds to a second protocol different from the first protocol, transferring data between the host unit and the IC card after performing protocol conversion of transfer data.

2. The reader/writer according to claim 1, wherein the data transmitted from the host unit has an attached node address and the first control means has means for analyzing only data with a node address of the IC card reader/writer attached thereto and for transferring the other data directly to the IC card.

3. The reader/writer according to claim 2, wherein the data with a node address of the IC card reader/writer contains a card ejection command and the IC card reader/writer has means for ejecting the IC card upon receipt of the card ejection command.

4. The reader/writer according to claim 1, wherein the first protocol is comprised of a block transmission protocol and the second protocol is comprised of a character transmission protocol and the second control means has means for buffering block unit data from the host unit and for transferring the data to the IC card after converting the block unit data to a character unit data from the IC card and for transmitting the data to the host unit after converting the character unit data to a block unit data.

5. An IC card reader/writer connected to a host unit performing communication based on a first protocol and adapted to be operated based on a command from the host unit and to transfer data to and from an inserted IC card, comprising:

an IC card interface for providing an interface with an IC card;

a communication interface for providing an interface with the host unit;

first receiving means for receiving an IC card insertion request command from the host unit through the communication interface;

activating means for, when the IC card is inserted, activating the IC card through the IC card interface;

second receiving means for, when the IC card is activated, receiving a specific piece of data from the IC card through the IC card interface;

identifying means for, when the inserted IC card is activated via the IC card interface, identifying a protocol type of the IC card based on data received by the second receiving means;

a mode switch provided between the IC card interface and the communication interface to switch a transmission mode between the host unit and the IC card via the IC card reader/writer;

first control means for, when a protocol type of the IC card corresponds to the first protocol, the same type as the host unit, as a result of the identifying means, switching the mode switch to a through mode and transferring data between the host unit card and the IC card directly; and second control means for, when the protocol type of the IC card corresponds to a second protocol different from the first protocol as a result of identification by the identifying means, switching the mode switch to a through inhibiting mode and transferring data between the host unit and the IC card after a corresponding protocol conversion of transfer data has been achieved.

6. The reader/writer according to claim 5, wherein the first protocol is comprised of a block transmission protocol and the second protocol is comprised of a character transmission protocol and the second control means has means for buffering block unit data from the host unit and for transferring the data to the IC card after converting the block unit data to a character unit data and means for buffering the character unit data from the IC card and for transmitting the data to the host unit after converting the character unit data to a block unit data.

7. A method for transferring data for an IC card reader/writer connected to a host unit performing communication based on a first protocol and adapted to be operated based on a command from the host unit and to transfer data to and from an inserted IC card, comprising the steps of:

(a) receiving an IC card insertion request command from the host unit;

(b) activating the IC card when the IC card is inserted;

(c) receiving, when the IC card is activated, a specific piece of data from the IC card;

(d) identifying a protocol type of the IC card based on data received by the step (c) and providing a result of identification;

(e) when the protocol type of the IC card corresponds to the first protocol type, the same as the host unit, as a result of identification, controlling data to be transferred between the host unit and the IC card directly;

(f) when the protocol type of the IC card is a second protocol different from the first protocol as the result of identification, subjecting transferred data to protocol conversion; and (g) controlling the protocol-converted data to be transferred between the host unit and the IC card.

* * * * *